Figure 1:
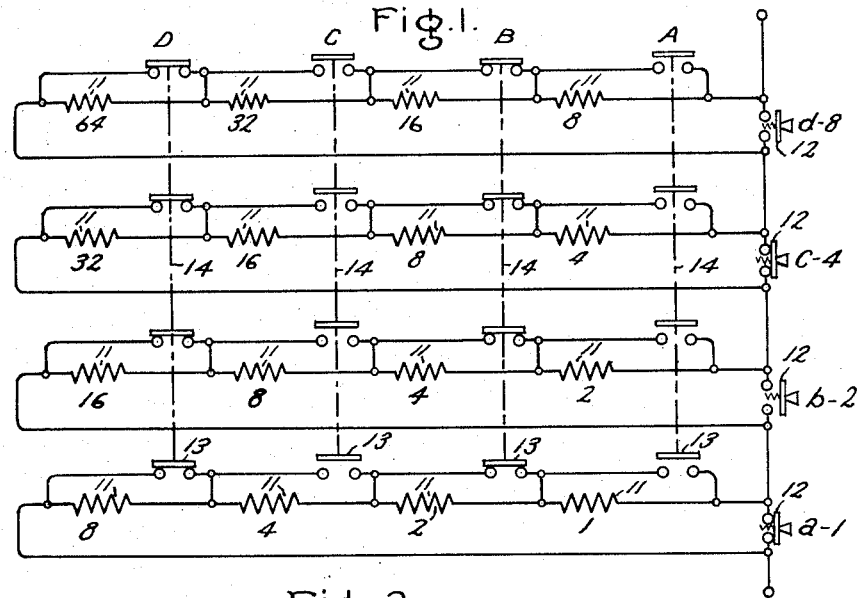

July 7, 1959  H. D. PARKS  2,893,636

MULTIPLYING NETWORK

Filed Dec. 3, 1952  2 Sheets-Sheet 1

Inventor:
Herman D. Parks,
by Paul A. Frank
His Attorney.

July 7, 1959

H. D. PARKS 2,893,636

MULTIPLYING NETWORK

Filed Dec. 3, 1952

2 Sheets—Sheet 2

Inventor:
Herman D. Parks,
by Paul A. Frank
His Attorney.

United States Patent Office 2,893,636
Patented July 7, 1959

2,893,636

MULTIPLYING NETWORK

Herman D. Parks, Schenectady, N.Y., assignor to General Electric Company, a corporation of New York Application December 3, 1952, Serial No. 323,915

8 Claims. (Cl. 235—194)

The present invention relates to an electrical network for effecting mathematical operations.

More specifically, the invention relates to a multiplying network for use in electrical computing machines, and particularly for use in electrical computing machines of the analogue type.

In the construction of electrical computing machines, one of the foremost problems presented to a builder is the choice of the basic computer design to be used. While the analogue type computer is relatively simple to construct and operate, it heretofore has not been as accurate or reliable as its counterpart the digital computer. For this reason, wherever great accuracy is required, the digital computer design has been used with a consequent increase in the complexity of the machine. In order to increase the number of applications in which the analogue computer could be used, it was therefore necessary to increase its accuracy and reliability, and since the operational characteristics of the over-all computer are in turn dependent upon the quality of operation of its component elements, the job narrows down to that of improvement of the components. One such component is the multiplying network. While there are a number of known multiplying networks available in the art, none are capable of providing the desired accuracy and reliability. Further, in addition, the design of the known multiplying networks is such that it is frequently impracticable to add together the products of such networks in a single output circuit. Hence, these networks cannot be readily used in mathematical operations wherein it is necessary to obtain the sum of a series of products such as are found in many physical problems.

It is, therefore, one object of the present invention to provide an improved multiplying network for use in computers which is capable of obtaining highly accurate results, and which facilitates summation of the product produced thereby with a number of products obtained from similar networks.

Another object of the invention is to provide a multiplying network which incorporates the simplicity of analogue computer design, but nevertheless is as flexible in its use as a digital type computer in that it utilizes step by step computation techniques.

A still further object of the invention is to provide a multiplying network wherein a resistance analogy is used, and which presents at its output terminals a resistance which is proportional to the product of two factors fed into the network.

In practicing the invention, a network is provided for effecting mathematical operations which includes a matrix of inert impedances having diverse, mathematically related values of impedance, and selectively operable electric switch means for selectively connecting desired combinations of the impedances of the matrix into electrical circuit relationship.

Figure 2:
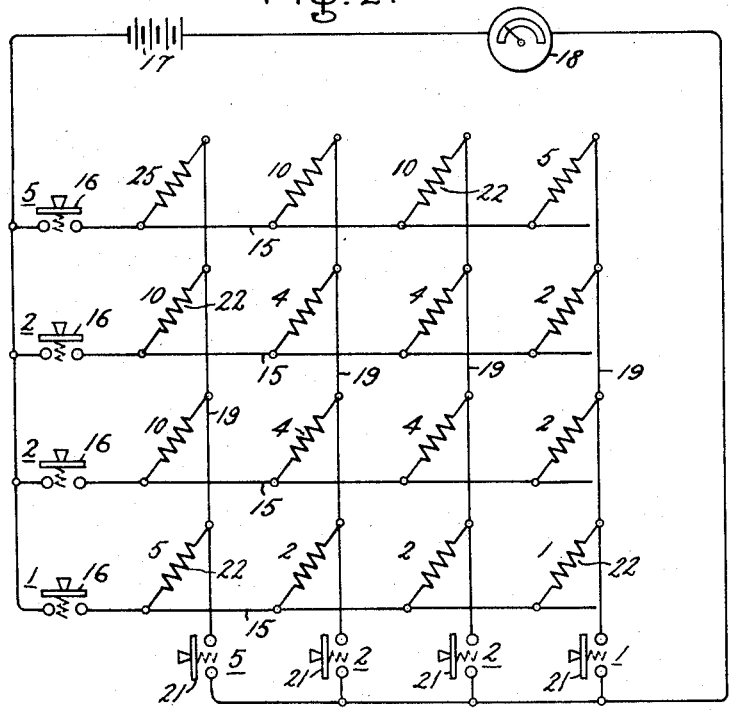
Figure 3:
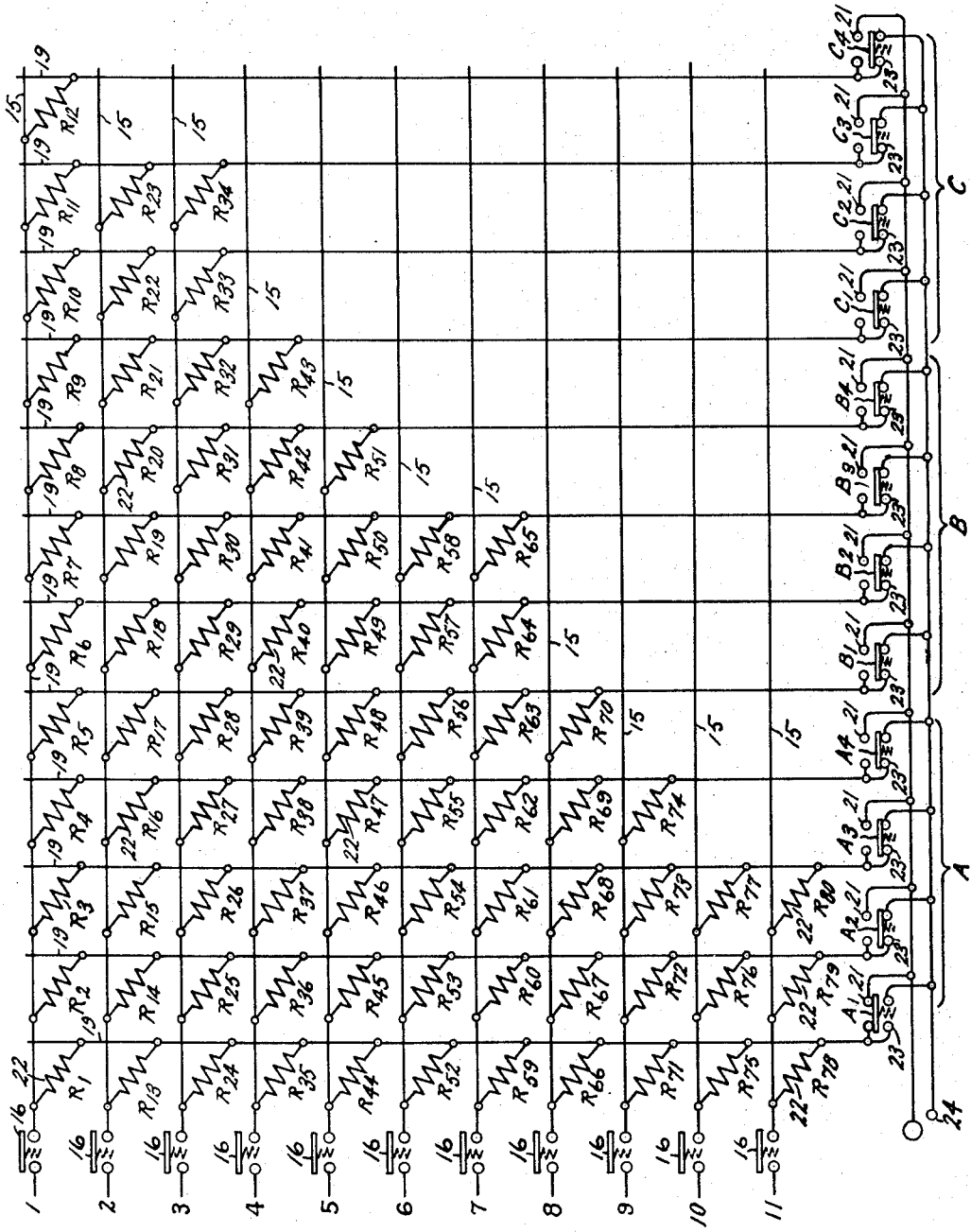

Other objects, features and many of the attendant advantages of this invention will be appreciated more readily as the same becomes better understood by reference to the following detailed description, when considered in connection with the accompanying drawings: Fig. 1 is a schematic circuit diagram of one form of the improved multiplying network; Fig. 2 is a schematic circuit diagram of a second form of an improved multiplying network; and Fig. 3 is a schematic circuit diagram of an embodiment of a multiplying network similar in construction to that shown in Fig. 2, and illustrates how the network might be modified to meet the needs of a specific computer construction.

Fig. 1 discloses one form of a multiplying network constructed in accordance with the invention, which is identified as a series multipler. The series multiplier includes a matrix of inert impedances formed by a plurality of sets of series connected resistors 11 which are arranged in a predetermined order, and have diversely weighted mathematically related values of resistance. Connected across each set of resistors is a selectively operable electric switch means formed by a plurality of line switches 12 which are adapted to short circuit all of the resistors in each of the sets $a$, $b$, $c$, $d$, and are assigned the values indicated. For example, resistors having a value of resistance of 1 ohm, 2 ohms, 4 ohms and 8 ohms respectively in line or set $a$, are short circuited by a line switch 12 which is assigned the value one (1), resistors having the values of 2 ohms, 4 ohms, 8 ohms, 16 ohms, respectively in line or set $b$, are short circuited by a line switch 12 which is assigned the value two (2), and so on. Second switch means are also provided for selectively short circuiting each of the individual resistors in each set, and comprise a plurality of electric switches 13 which are connected across each individual resistor 11, and can be operated to selectively short circuit any one of the resistors. In order to facilitate operation of the switches 13, the corresponding switches in each set, that is the resistors in each set having the lowermost value of resistance, the next lowermost value, etc., are connected together in columns, A, B, C, D, by a mechanical interconnection 14, and the columns A, B, C, D, assigned the values 1, 2, 4, 8, respectively.

In operation the multiplying network shown in Fig. 1 serves to present at its two terminals a resistance which is proportional to the product of two numbers set into the machine. For example, should it be desired to obtain the product of two numerals (a multiplier and a multiplicand) 5×10, the number 10 (the multiplicand) is entered by opening line, or multiplicand, switches 12 which are in the circuit of the sets of resistors $b$ and $d$ which correspond to the numbers 2 and 8, and the line switches $c$ and $a$ corresponding to the values 1 and 4 are closed. By this action all of the resistors in the sets controlled by line switches $a$ and $c$ are short circuited and thus are eliminated from the final ohmic value presented at the output terminals of the network. In other words, the position of the line switches 12 determines which of the sets of resistors $a$, $b$, $c$, and $d$ are connected in the matrix and thereby set the magnitude of the multiplicand into the matrix. In order to set the numeral 5 in the matrix as the multiplier, all of the switches in the columns A and C are opened, and the switches in the columns B and D are closed. By inspection of the network, it can be readily determined that only the resistors at the intersection of the open switches, having the values of resistance of 8 ohms, 32 ohms, 2 ohms, and 8 ohms will be included in the final ohmic value of the network, and that the summation of the resistance values equals 50 ohms which is the product desired. In a similar manner, it can be shown that the multiplying network illustrated in Fig. 1 can be operated to effect multiplication of any numbers between 0 and 15. As described above the line switches 12 were utilized to set the magnitude of the multiplicand into the matrix and switches in the columns A, B, C and D were utilized to set the magnitude of the multiplier into the matrix for convenience of discussion. However, it is evident that either switch means; i.e., either of the two sets of switches, may be utilized to set the magnitude of either term of the product into the matrix.

From the foregoing description, it can be readily appreciated that the invention provides a multiplying network wherein it is possible to present at the output terminals of the network a total ohmic resistance which is proportional to the product of two values fed into the network. Because the network utilizes step by step computation of the product desired, the results obtained are accurate and reliable; and further, because the analogy used is resistance, the network facilitates summation of the product produced thereby with the products of other similar networks. Additionally, the embodiment of the invention disclosed in Fig. 1 has been cited as merely exemplary, and it should be understood that the capacity of the multiplier can be increased to handle larger value numbers by increasing the number of lines in columns in accordance with the binary, the decade, or some other number system. Also, the invention is not restricted in its use to the number system cited, but may be adapted for use with any suitable series such as the 1, 2, 2, 5, or the 1, 2, 4, 8, 10, 20, 40, 80, 100 by proper modification.

Still a second form of the invention is disclosed in Fig. 2 of the drawing. In the embodiment shown in Fig. 2, the resistor elements are treated as conductances rather than as resistors, and are added as conductances in parallel rather than as resistors in series, as was done in the form of the invention shown in Fig. 1. The multiplying network of Fig. 2 comprises a plurality of first, horizontal, electrically conductive terminal strips 15, each of which is connected through a selectively operable electric switch 16 and a battery source of electric energy 17, to one side of an ammeter 18. The other side of the ammeter 18 is adapted to be connected to a plurality of second, vertical, electrically conductive terminal strips 19 through the medium of a plurality of second, selectively operable electric switches 21. The second conductive terminal strips 19 are disposed transversely to the first terminal strips 15 so as to intersect the same at substantially right angles, and are electrically insulated from the first terminal strips 15. In order to complete the electric circuit thus comprised, a resistor element 22 is bridged across each of the intersections of the first and second terminal strips. The resistor elements are arranged in a predetermined order in the network, and have values of resistance, such that the conductances thereof are mathematically related. For example, one of the resistors might conduct 25 times as much current as another of the resistors, or some other similar relationship. If the resistors are arranged in the order shown in Fig. 2 so that the resistor in the top left corner of the network conducts 25 times as much current as the resistor in the lower right-hand corner of the network, and the intermediate resistors have intermediate values, the switches 16 should be assigned the values 1, 2, 2, 5 as indicated, and the switches 21 should be assigned similar values in the manner illustrated.

In operation, if both switches in the groups 16 and 21 valued at 5 are closed, only the resistor in the upper left corner of the network conducts, and the ammeter 18 will read 25 units of current flow. Similarly, the closing of any one of the switches 16 serves to introduce one of the factors to be multiplied; e.g., the multiplier, into the network, and actuation of any one of the switches 21 serves to introduce the remaining factor to be multiplied; e.g., the multiplicand, into the network. As a result, current will flow through the resistor of the network common to the two terminal strips switched into the circuit, and will have a value which is equal to the product of the two valves represented by the switches actuated. Further combinations of switches are just extensions of the same principle. Hence, to multiply 8 times 3 with the network described, it would be necessary to express the numbers as $(5+2+1)$ and $(2+1)$. To enter these numbers into the multiplying network, all that would be required is that the 5, 2, and 1 switches in the vertical or second terminal strips be closed, and the 2 and 1 switches in the horizontal or first terminal strips be closed. The desired value will then appear as $$8 \times 3 = (5+2+1) \times (2+1) = 5 \times 2 + 5 \times 1 + 2 \times 2 +$$
$$2 \times 1 + 1 \times 2 + 1 \times 1 =$$
$$10 + 5 + 4 + 2 + 2 + 1 = 24$$

which is the operation performed by the multiplying network. It should be noted that the six conductances switched into the circuit are equal to the six terms underlined above.

The multiplying network of Fig. 2 incorporates substantially all of the advantages of the network shown in Fig. 1 with the exception that it does not utilize a resistance analogy, and in addition, has the further advantages of requiring fewer switches and simpler wiring. Hence, the embodiment of the invention shown in Fig. 2 is relatively inexpensive to construct.

While the network shown in Fig. 2 is limited, of course, to multiplying only single integer numbers from 1 to 10, the method used for multiplication is valid for much larger numbers, so that the system can be incorporated into a greatly expanded network. One practical arrangement for multiplying integers having values from 1 to 100 is illustrated in Fig. 3 of the drawing wherein like parts have been given the same reference numeral as corresponding parts in the multiplying network of Fig. 2. The multiplying network illustrated in Fig. 3 is designed to be incorporated in a particular type analogue computer wherein the values to be operated on are such that the lower value integers are not necessary. Hence, resistors having low values of conductance have not been included, and only those resistors having values of conductance which extend over the desired range are included in the network. In other respects the construction and operation of the multiplying network shown in Fig. 3 is identical to that of the network illustrated in Fig. 2, with the exception of the addition of a shunt compensation means.

The inclusion of a shunt compensation means is necessitated by reason of the additional shunt paths formed by resistors not desired to be included in the multiplying network during a multiplying operation. For example, if it is desired to multiply $50 \times 50$ then the switch $A_1$ of the switch bank 21 and the switch 1 of the switch bank 16 should be closed. With the network thus conditioned, a closed circuit should exist only through the resistor R1. However, a second shunt path can be traced through the resistors R13, R14 and R2 which tends to throw off the current flowing in the network from its desired value. Additional shunt paths may be traced through a resistor such as R24, R35, R44, etc. In order to compensate for the shunting effects of the resistors not desired to be included in the circuit, a compensating potential is applied to each branch of the shunt path in opposition to the potential developed thereacross by reason of shunt path current flow. This compensating potential is applied through the shunt compensation means which includes a plurality of additional switch contacts 23 that are connected to the second or vertical conductive strips 19 in parallel with the switch contacts 21. The additional switch contacts 23 are complementally operable with respect to the switch contacts 21 in that each is adapted to be normally closed when its associated switch 21 is open, and opens automatically upon its associated switch 21 being closed. By this construction, a compensation potential can be applied to a terminal line 24 which is coupled through the normally closed switch contacts 23 to each of the shunt paths in the network. This compensation potential has polarity and a value such that it opposes and nullifies the current flowing through the shunt path, and is obtained by treating all of the shunt paths of the network as a lumped constant, then developing a voltage from a potentiometer or the like which is suitable for countering the potential drop across the lumped constant.

From the foregoing description, it can be appreciated that the invention provides improved multiplying networks for use in electric computers which are capable of obtaining accurate and dependable results, and which facilitate summation of the products produced thereby with a number of products obtained from similar networks included in electrical circuit relationship therewith. The network incorporates the simplicity of design of an analogue computer, and yet provides the flexibility and reliability of operation of a digital type computer in that it utilizes step by step computation techniques. Further, in a specific embodiment of the network, a resistance analogue is used so that the network presents at its output terminals an ohmic resistance which is proportional to the product of two factors fed into the network. Because resistances can be added with much greater accuracy than currents or voltage, this feature further enhances the value of the network as a multiplier in that summation of the product of the multiplier with other products is greatly facilitated. Additionally, in still another embodiment of the invention, the number of switches required to perform the step by step computation technique employed to effect multiplication in the network, is reduced to an absolute minimum, and results in greatly simplifying wiring and construction of the network, as well as to cut the cost thereof.

In the light of the foregoing teachings, other modifications and variations of the invention will be suggested by those skilled in the art. It is therefore to be understood that changes may be made herein which are within the full intended scope of the invention as defined by the appended claims.

What I claim as new and desire to secure by Letters Patent of the United States is:

1. A network for effecting mathematical multiplication including in combination a matrix of inert impedances having mathematically related values arranged in horizontal rows and vertical columns between a pair of output terminals, first digitally operable electric switch means arranged in a vertical column for connecting selected ones of said inert impedances into partial electric circuit relationship in accordance with the value of the multiplier, second digitally operable electric switch means arranged in a horizontal row for connecting the selected ones of said inert impedances into complete electric circuit relationship across said output terminals in accordance with the value of the multiplicand, the impedance of said matrix across said output terminals being determined by the settings of said first and second switch means and representing the product of the multiplier and multiplicand.

2. A multiplying network including in combination a plurality of parallel first conductive terminal strips, electric switch means connected to each of said first strips for establishing a multiplier value, a plurality of parallel second conductive terminal strips disposed transversely to and electrically insulated from said first strips, electric switch means connected to each of said second strips for establishing a multiplicand value, and impedances of selected values interconnecting respective pairs of said first and second strips at the intersections thereof, and output means respectively connected to said electric switch means for providing an output proportional to the product of said multiplier and multiplicand values.

3. A multiplying network including in combination a plurality of parallel first conductive terminal strips, a selectively operable electric switch connected to each of said first strips for establishing a multiplier value, a plurality of parallel second conductive terminal strips disposed transversely to and electrically insulated from said first strips, a selectively operable electric switch connected to each of said second strips for establishing a multiplicand value, a resistor interconnecting respective pairs of said first and second strips at the intersection thereof, said resistors being arranged in a predetermined order and having mathematically related values of resistance, and output means respectively connected to said electric switch means for providing an output proportional to the product of said multiplier and multiplicand values.

4. A multiplying network including in combination a plurality of parallel first conductive terminal strips, electric switch means connected to each of said first strips for establishing a multiplier value, a plurality of parallel second conductive terminal strips disposed transversely to and electrically insulated from said first strips, first electric switch means connected to each of said second strips for establishing a multiplicand value, impedance means interconnecting respective pairs of said first and second strips at the intersection thereof, a shunt path compensation circuit comprising additional electric switch means connected between each of said second terminal strips and a source of compensation potential, said additional switch means being complementally operable with respect to the first electric switch means on said strips, and output means respectively connected to said switch means as connected to said first and second strips for providing an output proportional to the product of said multiplier and multiplicand values.

5. A multiplying network including in combination a plurality of parallel first conductive terminal strips, a selectively operable electric switch connected to each of said first strips for establishing a multiplier value, a plurality of parallel second conductive terminal strips disposed transversely to and electrically insulated from said first strips, a selectively operable first electric switch connected to each of said second strips for establishing a multiplicand value, a resistor interconnecting respective pairs of said first and second strips at the intersections thereof, said resistors being arranged in a predetermined order and having mathematically related values of resistance, a shunt path compensation circuit comprising an adidtional electric switch connected between each of said second terminal strips and a source of compensation potential, said additional electric switches being complementally operable with respect to the first electric switches connected to said terminal strips, and output means respectively connected to said switch means as connected to said first and second strips for providing an output proportional to the product of said multiplier and multiplicand values.

6. A network for effecting mathematical operations including in combination a plurality of sets of series connected diversely weighted impedances, said sets being connected in a series circuit, first selectively operable electric switch means connected across each set of series connected impedances for selectively short circuiting the same, and second selectively operable electric switch means connected across each impedance of each set for selectively short circuiting a desired one of the impedances, related ones of said impedances having the short circuiting switches thereof mechanically interconnected and operable together.

7. A network for effecting mathematical operations including in combination a plurality of sets of series connected impedances having diverse values, said sets being connected in a series circuit, selectively operable electric switch means connected across each set of series connected impedances for selectively short circuiting the same, and second selectively operable electric switch means connected across each impedance of each set for selectively short circuiting a desired one of the impedances, corresponding ones of said impedances in each set having the short circuiting switches thereof mechanically interconnected and operable together.

8. A network for effecting mathematical operations including in combination a plurality of sets of series connected resistors arranged in predetermined order and having diversely weighted mathematically related values of resistance, said sets being connected in a series circuit, a selectively operable electric switch connected across each set of series connected resistors for selectively short circuiting the same, and a selectively operable electric switch connected across each resistor of each set for selectively short circuiting a desired one thereof, corresponding ones of the resistors in the sets having the short circuiting switches thereof mechanically interconnected and operable together.

References Cited in the file of this patent

UNITED STATES PATENTS

| | | |
|---|---|---|
| 2,094,370 | Moses | Sept. 28, 1937 |
| 2,108,146 | Simpson | Feb. 15, 1938 |
| 2,503,932 | Barbey | Apr. 11, 1950 |
| 2,511,924 | Lee | June 20, 1950 |
| 2,584,897 | Marco | Feb. 5, 1952 |
| 2,740,584 | Jacobi et al | Apr. 3, 1956 |

FOREIGN PATENTS

| | | |
|---|---|---|
| 77,939 | France | Apr. 16, 1935 |
| 687,419 | Germany | Jan. 29, 1940 |
| 668,384 | Great Britain | Mar. 19, 1952 |